EARL C. NEWTON.
Improvement in Carriages.
No. 121,295. Patented Nov. 28, 1871.
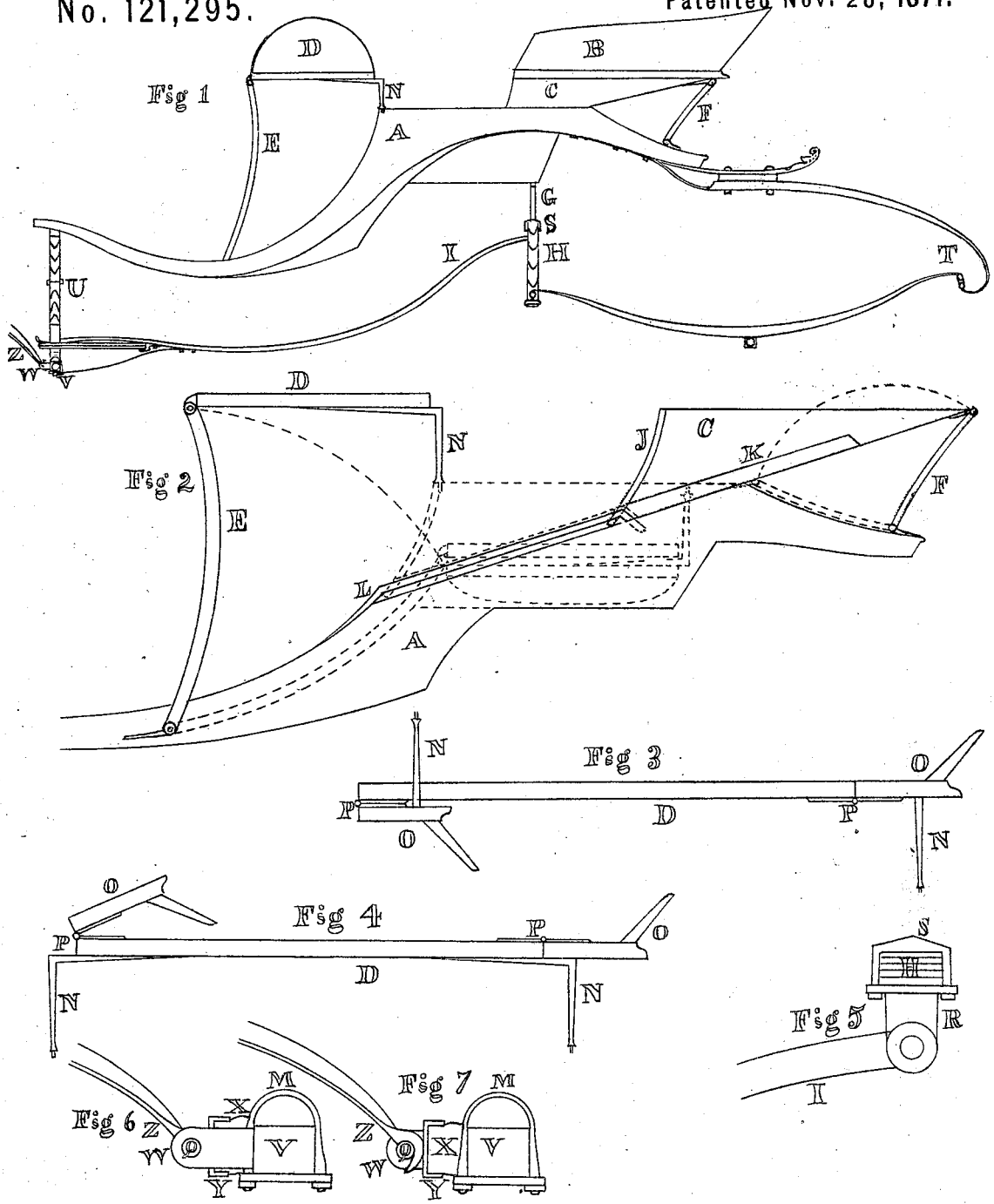

UNITED STATES PATENT OFFICE.

EARL C. NEWTON, OF BATAVIA, ILLINOIS.

IMPROVEMENT IN CARRIAGES.

Specification forming part of Letters Patent No. 121,295, dated November 28, 1871.

*To all whom it may concern:*

Be it known that I, EARL C. NEWTON, of Batavia, in the county of Kane and State of Illinois, have invented certain Improvements in Carriages, of which the following is a specification:

The first part of my invention relates to the movable seats, for the purpose of making one or two seats in the same carriage. The second part of my invention relates to the coupling of the reach and spring together. The object is its cheapness, lightness, beauty, and durability. The third part of my invention relates to the shaft-coupling or the manner of attaching the shafts to the axle and preventing the wearing out of the shaft rubber.

Figure 1 is a side elevation of the carriage part and body, showing it in its two-seated form. A is the body; B, the back seat; C, the seat-riser; D, the front seat, supported by jump-iron E, and leg N. U is the front spring. T is the back spring. I is the reach, which is coupled to the cross-spring H. G is the brace that connects the cross-spring H to the body A. S is the clip, which fastens the brace G to the cross-spring H. V is the front axle; W, the shaft-coupling; Z, the shaft-iron.

Fig. 2 is a sectional view of the movable parts of the body and seats. L is a slide-iron, which is placed on an inclined plane for the purpose of raising the back seat B and riser C, when shoved back, as shown in Fig. 1. J is a plate of iron fastened to the front of seat-riser C. Said iron J has a hole through the bottom end for the purpose of sliding on the slide-iron L. K is a groove in the bottom of seat-riser C to allow said seat-riser C to slide down over the slide-iron L. F is a jump-iron, which supports the back end of the seat-riser C and seat B, and when the seat-riser C and seat B are shoved forward, as shown by dotted lines, the jump-iron F jumps the back end of seat-riser C and seat B over, as shown by the dotted lines. When the seat-riser C is shoved forward, as shown by dotted lines, the jump-iron F lays on the back of the body A, as shown by dotted lines. D is the front seat supported by jump-iron E and leg N, and when not in use is folded up and jumped back into the center of the body A, as shown by the dotted lines, and when in this position the seat-riser C and seat B is shoved down over it, as before described.

Fig. 3 is a front view of the front seat D, showing the manner of folding it before it is placed back into the body A, as before described. O is the end of the seat D, folded on the hinge P, as shown at the left end of Fig. 3.

Fig. 4 is another front view of the seat D, showing the end of the seat O folded over on top of the seat D, instead of being folded under, as shown in Fig. 3.

Fig. 5 is a sectional view of the connection of the reach I with the cross-spring H. R is a clip tie, which also forms a socket to receive the end of reach I, which is fastened with a bolt, making a hinge-joint. S is a clip passing around the cross-spring H and down through the clip-tie R, and fastened with nuts for the purpose of holding the clip-tie or socket R firmly to the cross-spring H for the support of the reach I, which is fastened, as before said.

Fig. 6 shows a side view of the shaft-coupling.

Fig. 7 is a sectional view of the shaft-coupling W, which is fastened to the axle V by means of the clip M. The shaft-iron Z is hooked over the pin Q and held in place by the block of rubber X, which is cased on one side, and a portion of the top and bottom of the metallic cap Y. Said cap Y protects the rubber block X from the friction of the shaft-iron Z, which saves the rubber block X from being worn out.

I claim as my invention—

1. The sliding of the seat B and seat-riser C on an inclined plane, substantially as and for the purpose hereinbefore set forth.

2. The combination of sliding one end and jumping the other end of the seat-riser C and seat B, substantially as and for the purpose hereinbefore set forth.

3. The folding of the seat D, substantially as and for the purpose hereinbefore set forth.

4. The connecting of the reach I with the cross-spring H, substantially as and for the purpose hereinbefore set forth.

EARL C. NEWTON.

Witnesses:
HENRY K. WOLCOTT,
ALSON H. ARNOLD.

(31)